(No Model.)
A. W. BILLINGS.
MASH MACHINE.
No. 431,246. Patented July 1, 1890.
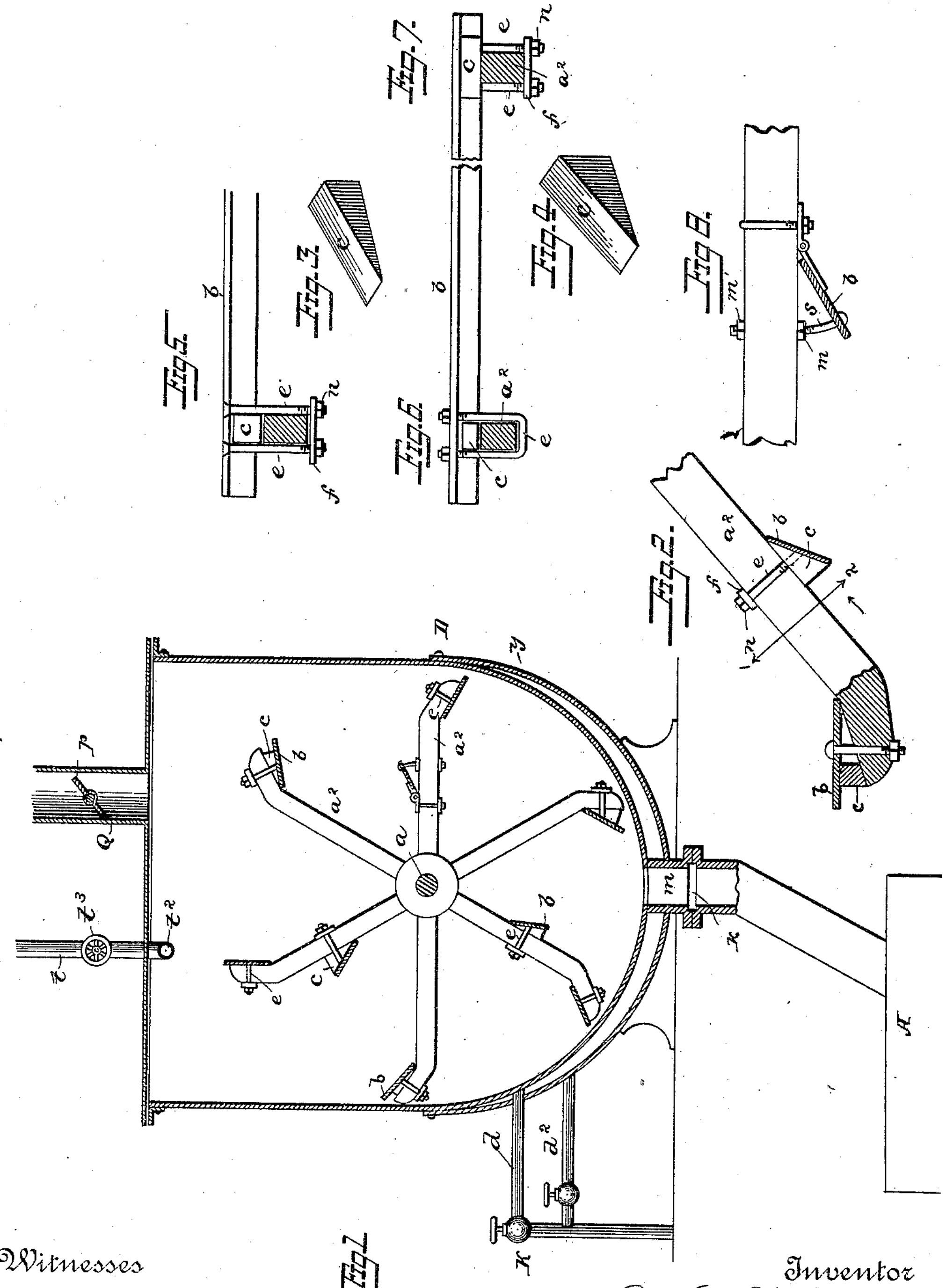
Witnesses
N. G. Campbell.
A. E. T. Hansmann.
Inventor
Andrew W. Billings,
By Foster & Freeman
Attorneys
THE NORRIS PETERS CO., PHOTO-LITHO., WASHINGTON, D. C.

UNITED STATES PATENT OFFICE.

ANDREW W. BILLINGS, OF BROOKLYN, NEW YORK, ASSIGNOR TO THE BILLINGS PROCESS COMPANY, OF JERSEY CITY, NEW JERSEY.

MASH-MACHINE.

SPECIFICATION forming part of Letters Patent No. 431,246, dated July 1, 1890.

Application filed February 9, 1887. Serial No. 227,059. (No model.)

*To all whom it may concern:*

Be it known that I, ANDREW W. BILLINGS, a citizen of the United States, and a resident of Brooklyn, in the county of Kings and State of New York, have invented certain new and useful Improvements in Mash-Machines, of which the following is a specification.

My invention relates to certain improvements in the apparatus for and method of manufacturing beer set forth in Letters Patent No. 324,523, granted to me August 18, 1885; and my invention consists in combining and heating the materials forming what I term the "supplemental mash," which consists of raw grain and malt mixed in proper proportions and under conditions as set forth in said patent, as fully set forth hereinafter, so as to adapt the operation to the character of the material acted upon and reduce the length of time required in making the supplemental mash, and also in certain improvements in the apparatus. In this class of apparatus, as ordinarily constructed, the stirrer-blades are immovably fixed in position, or are so arranged and fitted for the one kind of mash to be made that they cannot be used for anything else than for an ordinary mash, nor can they be changed in any manner, and they fail to so agitate the mass as to maintain all parts at the same temperature and in the same condition. In the apparatus as constructed by me the blades are easily and readily changed as to number, position on the arms, their angle to the arms and each other without any danger of their working loose while in motion, thus enabling me to make either a very thick or thin mash and successfully operate with any kind of grain (malted or unmalted) or starch, maintain all parts in the same condition, obtain the largest possible percentage of extract, and to use a very much larger percentage of the raw grain.

I construct the apparatus to secure a great heating-surface in the jacket, and am thus enabled to use the machine to a very great advantage as a boiling-kettle for breaking the albumen in the worts and obtaining the extract, for which purpose this class of machines as ordinarily constructed is not adapted and inadequate and cannot be used at the same time, and I am enabled to use a very much smaller percentage of hops. By adjusting the blades to the proper angle and setting them revolving slowly they serve to open the hop, thus obtaining the full percentage of extract of the hop without breaking them so fine that the worts will not run off or filter through when settled in the hop-jack, as is generally the case when hop-cutting or other devices are used for breaking up the hop to obtain the extract, and by setting the blade at the proper angle proportioned to the density of the mash I am enabled to carry the material from the heated surfaces to the center and back so quickly that no part will be heated more or less than the other.

In the drawings, Figure 1 is a part sectional elevation of sufficient of a brewing apparatus to illustrate my improvement. Fig. 2 is a detached enlarged side view of one of the arms of the stirrer-frame, showing the stirring-blades and adjusting devices. Figs. 3 and 4 are perspective views of different adjusting-blocks; Figs. 5 and 6, cross views of parts of the frame and blades, showing the latter adjusted to different angles. Fig. 7 is a cross-section on the line 1 2, Fig. 2, looking in the direction of the arrow. Fig. 8 is a detached view showing another form of blade-adjusting device.

The apparatus consists in its general features of the parts represented and described in my aforesaid patent, No. 324,523—that is, there is a tank D, having a steam-jacket $y$ below the bottom, into which steam is admitted from a pipe $d^2$, when desired, and another pipe $d$ serves to inject steam directly into the contents of the tank when a cock K is open, and within the tank revolves a shaft $a$, from which extends radially arms $a^2$, constituting parts of a revolving frame carrying blades $b$, which will be referred to more particularly hereinafter. An outlet $m$ at the bottom of the tank, controlled by a valve $k$, serves to permit the passage of the contents to an ordinary mash-tub A, arranged below the tank D, and a pipe $t^2$ within the tank communicates with a water-pipe $t'$, provided with a cock $t^3$, whereby either hot or cold water or other liquid may be injected into the tank. From the top of the tank extends a vapor-pipe Q, in which is a damper $q$, whereby to regulate the escape of the vapor from the tank.

In this class of apparatus as ordinarily constructed the blades *b*, secured to the arms $a^2$ of the revolving frame, are fixed in position, and are generally so arranged as to stir up and mix with the water the particles of grain which are thrown into the tank in making a grain-mash; but such apparatus is not suitable for use in my process, as while it stirs and agitates the material it will not move it to and from the heated surface, so as to maintain all parts at a uniform temperature or in the same state, so that one part becomes overheated before another is raised to the proper temperature, thereby destroying the diastase and impairing the efficiency of the process. Moreover, such apparatus cannot as thus constructed be used as a hop-boiler, as the effect of the blades is to beat and break the hops, which are generally introduced in a mass or large masses into the tank, the result being that the fine hop particles or broken leaves clog the filter subsequently used. In order to avoid these difficulties, I connect the blades adjustably to the arms or supports of the stirrer-frame, so that the positions or angles of both of the blades may be changed according to the operations that are to be performed, by which means I am enabled to so set them that they will move the material to and from the heating-surface in such manner as to maintain all parts in a uniform state, and in operating upon hops that they will stir and rub and separate the leaves without breaking them.

Different modes of connecting the blades to the arms so as to set them in any desired position upon the arms and alter their positions and angles at will may be employed, and I have illustrated different means in the drawings. Thus each blade *b* may be secured to angular blocks *c*, Figs. 2 and 7, each resting upon one of the arms $a^2$, and bolts *e* may extend past the sides of the arms through one or more plates *f*, crossing the opposite edge of the arm and pressed against the same by means of nuts *n*, which serve to clamp against the arm the blocks *c* and plates *f* and hold the blades *b* in position. By loosening the nuts *n* the blocks *c* may be slipped upon the arms $a^2$ to carry the blades *b* toward or from the shaft *a*.

Instead of connecting the bolts *e* to the blocks *c*, they may extend through openings or notches in the blades *b*, as shown in Figs. 5 and 6, this construction being specially suitable when the blocks are detachable, as described hereinafter.

It will be seen that by the above-described arrangement I am not only enabled to adjust the blades to any desired positions, but I am also able to readily apply any desired number of blades, so as to arrange one or more blades upon each series of arms, or reduce the numbers so that blades will only be carried by alternating arms.

The adjustment of the blades to alter the angle of the same may be effected in different ways. That which I prefer consists in the use of blocks *c* or wedges of different shapes or thicknesses, Figs. 3 and 4, one series of blocks being substituted for another when the angle of the blades is to be changed. In other instances each blade may be hinged to a plate adjustable upon the arms or secured in any suitable manner thereto, as shown in Fig. 8, and a screw-bolt *s* may extend through the arm with nuts *m m'*, whereby it may be changed in position to alter the inclination of the blade.

Although I have referred to the blades as carried by the frame consisting of the shaft and radial arms, it will be evident that any kind of a supporting-frame may be used with the blades adjustable thereon.

In the process of manufacture described in my aforesaid Letters Patent, No. 324,523, the malt and grain are introduced separately in the tub, the process in such case requiring care to insure perfect results. I have found that I can avoid some of the manipulations used in my aforesaid process, and otherwise improve it.

I introduce the water into the tank either hot or cold, and then run the malt and corn forming the supplemental mash into the water, after which, if necessary, the temperature is raised not to exceed 170° Fahrenheit, above which temperature the diastase or the starch-converting albumenoids contained in the malt, added, become coagulated, and therefor inert. As soon as the said temperature is reached the supplemental mash is at once cooled, either by the injection of cold water or of wort from the malt-mash into the tank, or otherwise, until the supplemental mash is at about the same temperature as the usual mash which has been prepared in the tub A, after which the supplemental mash is run into the tub A, and the subsequent operations are pursued as in ordinary brewing. The proportions of the two mashes may be varied to suit the different kinds of beer being produced, but usually consist of about two or three parts of the usual malt-mash to one of the supplemental mash. By this process and method I suppress all raw or corn flavor or taste, and the beer keeps as well if not better than when made by ordinary methods. The wort runs off freely and readily, the fermentation is perfect, and I am able to substitute a very much larger percentage of raw grain, increasing the saving to the brewer. I in no sense or manner change the flavor or taste of the beer, but each brewer maintains the character of his own product, creating no disturbance with his trade. I can and do make as pale, brilliant, palatable beer, only substituting corn, (the cheapest known ingredient,) as can be or is made with the more expensive substitutes—such as rice, starch, grape-sugar, &c.—though my machine can be used for any or all of them, and no skilled labor is required in making the conversion.

I am further enabled to reduce the time occupied by my former method in preparing the supplemental mash, so that it does not take longer than from thirty minutes to an hour, according to the method of cooling employed.

I am aware that it is old in a process of mashing grain to make use of two mashes, one consisting of malt and slop from a highwine or beer still, and the other consisting of cornmeal and said slop, which latter mash is mixed and cooked for a comparatively long time, after which cooking the malt-mash is mixed therewith and the process continued in substantially the ordinary manner. My process differs therefrom, however, in that I do not raise the temperature of the supplemental mash above 170° Fahrenheit and then rapidly cool this mash by the injection of cold water or wort to the ordinary mashing temperature, (about 155° Fahrenheit,) and thereby obtain a larger yield of beer of superior and greater brilliancy than were said supplemental mash heated to a temperature exceeding 170° Fahrenheit, and at the same time I save both time and labor and expense of material in the manufacture.

Without limiting myself to the precise construction and arrangement of parts shown, I claim—

1. The combination, with the tank, of a revolving skeleton frame mounted therein having projecting arms, blades inclined relatively to the faces of the arms by which they are carried and along which they are adjustable, and detachable devices for securing said blades to the arms in their adjusted inclined position, each device being adapted to be operated independently of all the others, whereby any arm may be provided with one or more blades, each adjustable and removable independently of all the others, substantially as described.

2. The combination of a mash-tub, the shaft provided with stirrer-arms, adjustable blades, and screw-bolts extending past the sides of the arms through plates at opposite edges of the arms, whereby the blades are adjustably secured upon said arms, substantially as and for the purpose set forth.

3. The combination, with a mash-tub provided with a stirrer-shaft and the arms of the stirrer, of adjustable blades *b*, detachable and adjustable securing devices, and detachable wedge-blocks *c*, substantially as and for the purpose set forth.

In testimony whereof I have signed my name to this specification in the presence of two subscribing witnesses.

ANDREW W. BILLINGS.

Witnesses:
ADAM FINCK,
HENRY MAJOR.